United States Patent
Grime et al.

[15] 3,687,465
[45] Aug. 29, 1972

[54] FLUID TIGHT ANNULAR SEALS

[72] Inventors: Frank L. Grime, Coventry; Arthur Downs, Kenilworth, both of England

[73] Assignee: Keelavite Hydraulics Limited

[22] Filed: Jan. 9, 1970

[21] Appl. No.: 1,831

[30] Foreign Application Priority Data

Jan. 10, 1969 Great Britain ............ 1735/69

[52] U.S. Cl. .................................. 277/188, 277/177
[51] Int. Cl. ............................................ F16j 15/10
[58] Field of Search ........ 277/123, 124, 165, 58, 177, 277/188, 176

[56] References Cited

UNITED STATES PATENTS

| | | | |
|---|---|---|---|
| 2,494,598 | 1/1950 | Waring | 277/188 |
| 2,705,177 | 3/1955 | Waring | 277/188 |
| 3,375,016 | 3/1968 | Jellinek et al | 277/58 |
| 2,760,794 | 8/1956 | Hartranft | 277/165 |

FOREIGN PATENTS OR APPLICATIONS 193,091  2/1923  Great Britain ............ 277/124

OTHER PUBLICATIONS

The Journal of Teflon Vol. 5 No. 4 May 1964 page 7 Slipper Seals: O–Rings with " Teflon" For Low Wear New York R. E. Hoffman Primary Examiner—William F. O'Dea
Assistant Examiner—Robert J. Smith
Attorney—Watson, Cole, Grindle & Watson

[57] ABSTRACT

A fluid seal of the O-ring type in which extrusion of the O-ring along the leakage path when under pressure is prevented by means of a support ring of bow-shaped cross-section on the downstream side of the O-ring between the O-ring and an abutment surface.

7 Claims, 2 Drawing Figures

INVENTORS
FRANK L GRIME
ARTHUR DOWNS
BY
Watson, Cole, Grindle & Watson
ATTORNEYS

FLUID TIGHT ANNULAR SEALS

This invention relates to fluid tight annular seals of the kind afforded by O-rings. Such seals are employed, for example, in pipe couplings but are also used in other locations where an annular leakage path is to be sealed.

By an O-ring is to be understood a ring which is usually but not necessarily of circular cross-section and which is made of rubber or other deformable resilient material and which is pressed up against an abutment wall, such as a shoulder, which reduces the cross-section of the path by the fluid pressure acting on one side of the ring to deform the ring and cause it to expand in directions generally perpendicular to the direction in which pressure is applied to it so as to seal against the two opposite surfaces between which it is positioned so as to prevent the escape of fluid past the O-ring along the annular leakage path.

When the cross-section of the O-ring or of the support ring (hereafter referred to) is mentioned, the term refers to one of the two sections produced by a section plane containing (assuming the case of a circular ring) the axis of generation of the ring.

A problem with O-ring seals is that the pressure acting on one side of the ring tends to force the ring against the abutment wall and into the narrow annular passage which must exist on at least one of the inner and outer boundaries of the abutment wall. This may be described as a tendency for the O-ring to be extruded into the narrow annular passage. Such extrusion may of itself impair the integrity of the seal and may also damage the O-ring and so give rise to imperfect sealing after the seal has been in use for some time. This is particularly the case if the pressure differences experienced are high and/or fluctuating. The tendency for extrusion to occur is clearly related to the breadth of the narrow annular passage. Where the two surfaces defining the narrow annular passage are machined surfaces it is possible, by specifying appropriately tight tolerances, to ensure that the passage is very narrow. However, this is not possible where one of the surfaces is not machined as, for example, is the case when one of the surfaces is that of a drawn, extruded or rolled pipe. The nominal external diameters of such pipes normally have quite wide tolerances. Not only may variations in the dimensions of one or both components affording the surfaces defining the narrow annular passage affect the size of the narrow annular passage but they may also affect the distance between the two opposite surfaces of the part of the annular leakage path against which the O-ring bears to effect a seal.

It has already been proposed in U.S. Pat. No. 2,456,356, issued Dec. 14, 1948 to J.S. Aber, to provide a restraining ring of the same material as the O-ring and positioned alongside the O-ring between the O-ring and an abutment wall afforded by the side of the groove in which the O-ring and the restraining ring are positioned. Various cross-sections of restraining rings are shown but in each case the surface against the abutment surface is flat. With this arrangement only a small part of the restraining ring is able to distort when pressure is applied so that this arrangement is only suitable where the dimensional tolerances of the parts to be sealed are very closely controlled. Another arrangement used as a dynamic seal is disclosed in U.S. Pat. No. 2,494,598 issued Jan. 13, 1950 to A.C. Waring. In this arrangement a rubber ring of circular cross-section bears against a shoulder on a piston. The shoulder is semi-circularly grooved to face the direction from which the pressure is to come. Between the shoulder and the rubber ring is a ring of polytetrafluoroethylene which is of arcuate cross-section so as to seat in the groove in the shoulder. When the seal is under pressure the lip formed by the outer edge of the arcuate ring is distorted into contact with the cylinder wall surrounding the piston. Here again, only a small part of the second ring is able to distort so that the tolerances must be very tight if the second ring is to function satisfactorily.

It is an object of the present invention to provide a seal assembly comprising an O-ring and a second ring which will operate satisfactorily over a wide dimensional tolerance range.

This object is achieved, according to the present invention, by constructing the surface of the support ring on the side adjacent the abutment wall and the surface of the abutment wall such that the support ring makes contact with the abutment wall only in a narrow annular region intermediate the radially inner and radially outer circumferences of the support ring.

Such a seal assembly operates in the following manner. When pressure is applied to the O-ring it deforms by decreasing its axial dimension and increasing its radial dimension in the usual way. It also presses the support ring against the abutment wall. The pressure of the O-ring on the concave surface of the support ring tends to open out the concavity thus closing the clearances between the support ring and the surfaces against which the O-ring seals. Thus extrusion of the O-ring is resisted. Since the support ring is in contact with the abutment wall only in a narrow annular radially intermediate region, the whole cross-section of the support ring is free to deform — that is to say, the cross-section of the support ring may be thought of as two cantilevers fixed at the central region where the support ring contacts the abutment wall and the radially inner and outer edges of the ring are free from restraint by the abutment wall.

Preferably the abutment wall extends radially, i.e., in a plane normal to the axis of the annular leakage path and of the O-ring and support ring, and the surface of the support ring adjacent the abutment wall is convex and may be approximately parallel with the concave surface so that the ring is of approximately constant thickness. In this case the support ring may be thought of as having a bow-shaped cross-section which is flattened when pressure is applied to it to move the ends of the bow further apart. Preferably the radius of curvature of the central portion of the concave surface of the support ring is slightly smaller than that of the O-ring, for example of the order of 5 to 10 percent smaller, so that in the undistorted condition the support ring will contact the O-ring at two regions which are radially spaced from one another on either side of the portion having the smaller radius of curvature and of the narrow annular region of contact of the support ring with the abutment wall as clearly shown in FIG. 2. The two rings may be stuck together in these regions of contact to form a single composite component for ease of handling and installation.

Since the whole cross-section of the support ring takes part in the deformation under pressure, it is possible to arrange for the relative movement apart of the radially inner and outer edges of the support ring to be considerable. This is of particular value where considerable variations in the dimensions of the annular leakage path are to be expected. Seal assemblies according to the present invention are therefore valuable when at least one of the relevant surfaces is unmachined as by being afforded by a pipe. However, they may also be useful where all the relevant surfaces are machined as they may make it possible to impose less rigorous tolerances on the finished dimensions of these surfaces.

The material of which the support ring is formed and/or its construction will usually be such that it will not itself act as a sealing ring preventing the flow of fluid under pressure past it and hence through the narrow annular passage referred to, the criterion being that, when the O-ring is under fluid pressure, the support ring should be so deformed by the action of the O-ring on it as to ensure that either there are no clearances between it and the opposite surfaces against which the O-ring seals or that such clearances are smaller than those into which the O-ring can be extruded to any appreciable degree by that pressure.

A suitable material for the support ring is nylon, particularly Nylon 11, or other moulded plastics material having sufficient rigidity not itself to be extruded into the narrow annular passage, the material preferably having a degree of resilience such that if, after having been deformed by the force exerted upon it by the O-ring, it is released from such force it will return to its original shape, thus permitting dis-assembly of the coupling, when not subject to pressure, followed by re-assembly of the same parts with the same ease as the original assembly.

The invention is particularly applicable to pipe couplings comprising a tubular coupling member which has a bore into which the end portion of the pipe is to be inserted, the seal to be established between the coupling member and the pipe. The coupling member includes an inner part of relatively small diameter to receive the end of the pipe and an adjacent part which is of larger diameter than the inner part, terminates at its junction with the inner part at an annular shoulder and forms — with the part of the pipe which it surrounds, the annular shoulder, and an annular distance piece which enters the open end of the bore freely and itself freely surrounds the pipe — an annular space in which an O-ring lies and is retained by said distance piece. In such a pipe coupling the support ring is placed between the O-ring and the end of the annular distance piece. The distance piece has concentric narrow annular passages on either side of it and the O-ring serves to prevent leakage of fluid from the pipe through these passages by providing the required fluid-tight seal between the pipe and the coupling member while the support ring abuts against the end of the distance piece and prevents extrusion of the O-ring into the narrow annular passages.

An example of such a pipe coupling is described and illustrated in the specification of Canadian Pat. No. 793,808. The present invention may be applied to such a pipe coupling by adding a support ring constructed and arranged in the manner described above.

One form of the invention as applied to a pipe coupling of the kind described in the above-mentioned specification is shown by way of example in the accompanying drawings in which.

Figure 1:
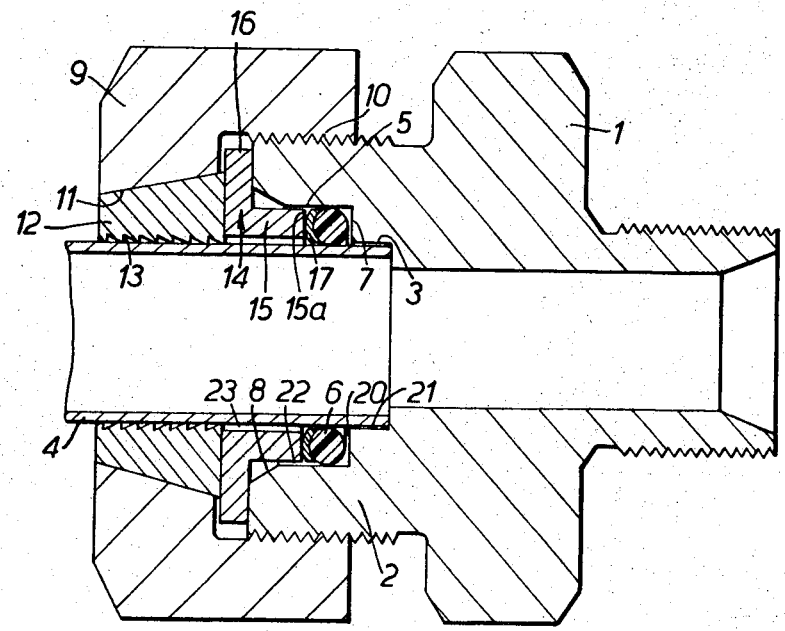
FIG. 1 is a cross-section through the coupling assembled with a pipe.

In the construction shown in FIG. 1 the coupling comprises a tubular coupling member 1 having an externally screw-threaded end portion 2 and a bore comprising an inner part 3 of a diameter such as to receive the end of a pipe 4 with a free but relatively close fit, an intermediate part 5 of substantially cylindrical form and substantially larger diameter than the pipe 4 to form an annular space 20 to receive a sealing ring 6 of the O-ring type and with a shoulder 7 between the parts 3 and 5, and an outer tapered part 8. Co-operating with the tubular coupling member 1 is a clamping member in the form of a ring nut 9 having a portion with an internal screw-thread 10 co-operating with the screw-threaded part 2 of the tubular member 1, and a portion having an internal circumferential surface 11 of frusto-conical form with its largest diameter adjacent to the tubular member 1. A split collet 12, which has a frusto-conical outer surface is arranged to lie within and to cooperate with the frusto-conical bore 11 and is formed internally with a series of serrations indicated at 13, which, in the assembled joint, grip the pipe 4 as shown.

Projecting into the space constituted by the part 5 of the bore of the tubular coupling member 1 and the adjacent part of the pipe 4 is a distance piece 14 of annular form comprising a cylindrical portion 15 having a plane end face 15a and an external flange 16 at one end of the cylindrical portion. The distance piece has a bore through which the pipe 4 passes freely but with relatively small clearance, the end of the cylindrical portion 15 adjacent to the O-ring 6 also lying freely but with a small clearance within the part 5 of the bore of the tubular coupling member 1.

Pressurized fluid from the pipe enters the annular space 20 through the annular clearance space 21 between the pipe and the tubular coupling member 1. The O-ring prevents fluid escaping from the annular space 20 through the narrow annular passages 22 and 23 between, on the one hand, the distance piece 14 and, on the other hand, the tubular coupling member 1 and the pipe 4 respectively.

Figure 2:
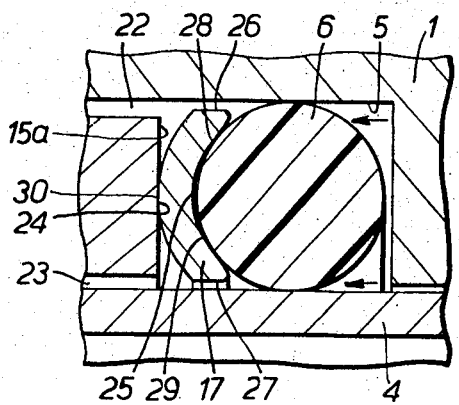
FIG. 2 is a cross-section on an enlarged scale showing the general form of the O-ring and support ring in their undistorted state before assembly.

Interposed between the O-ring 6 and the adjacent end of the distance piece 14 is a support ring 17 formed of nylon or similar material and having in its undistorted state a bow-shaped cross-section as shown in FIG. 2. The central part of the section is bounded by circular arcs 24, 25 while the outer parts are formed by wings 26, 27 having straight parallel sides. The O-ring and the support ring are stuck together along the regions 28, 29 where they touch. In the undistorted state, as shown in FIG. 2, the support ring 17 has external and internal diameters which are respectively slightly smaller than and slightly more than the external and internal diameters of the O-ring and are such that the support ring can lie in the annular space 21 with a small clearance between its outer circumference and the part 5 of the bore of the tubular coupling member 1 and a small clearance between its inner circumference and the outer circumference of the pipe 4. During the period of assembly when the support ring 17 and the O-ring 4 are being pushed by the distance piece 14 into position within the annular space in which they are to lie, the support ring 17 can move freely into the position in which the central region 30 of its convex surface abuts the plane end wall 15a of the distance piece 14. When, after assembly, fluid pressure from within the pipe 4 acts in normal manner upon the O-ring 6 to apply pressure to it in the direction indicated by the arrows in FIG. 2 the support ring 17 will be distorted by the force applied to it by the O-ring 6 so that the arms of the bow constituting its cross-sectional form will be opened out to bring the outer ends of these arms into engagement or close proximity with the surfaces respectively of the part 5 of the bore of the tubular coupling member 1 and the external circumference of the pipe 4. The narrow passages 22, 23 through which the O-ring might otherwise be partially extruded by fluid pressure are either reduced or eliminated in such a manner that no such extrusion occurs.

What we claim as our invention and desire to secure by by Letters Patent is:

1. A seal assembly comprising an annular leakage path to be sealed, the path being defined by at least annular outer and inner walls and an abutment wall which reduces the cross-section of the path, an O-ring in the path upstream of the abutment wall in the direction of leakage sealing engaging said annular walls, and a deformable support ring between the O-ring and the abutment wall, the support ring having a generally concave surface on the side adjacent the O-ring, the radius of curvature of the central portion of the concave surface of the support ring being slightly smaller than that of the adjacent surface of the O-ring, the surface of the support ring on the side adjacent the abutment wall and the surface of the abutment wall being such that the support ring makes contact with the abutment wall only in a narrow annular region intermediate the radially inner and radially outer circumferences of the support ring and the O-ring contacting the support ring in two regions which are radially inward and outward of said narrow annular region whereby pressure applied to the side of the O-ring remote from the support ring causes the radially inner and outer circumferences of the support ring to be bowed outwardly thereof so as to prevent extrusion of the O-ring past the support ring.

2. An assembly as claimed in claim 1 in which the abutment wall extends in a plane normal to the axis of the annular leakage path and of the O-ring and support ring.

3. An assembly as claimed in claim 1 in which the surface of the support ring adjacent the abutment wall is curved and is convex.

4. An assembly as claimed in claim 3 in which the surface of the support ring adjacent the abutment wall is approximately parallel with the concave surface.

5. A seal assembly as claimed in claim 1 in which the support ring is permanently secured to the O-ring.

6. A seal assembly comprising an annular path to be sealed, the path being defined by at least annular outer and inner walls and an abutment wall which reduces the cross-section of the path, an O-ring disposed in the path upstream of said abutment wall in the direction of leakage sealing engaging said annular walls, and a deformable support ring disposed between said O-ring and said abutment wall, said support ring having a generally concave surface on its side adjacent said O-ring, the radius of curvature of the central portion of the concave surface of the support being slightly smaller than that of the adjacent surface of the O-ring, and said support ring further having radially inner and radially outer circumferential walls respectively spaced a slight distance from said outer and inner walls in the relaxed condition of said support ring, the surface of said support ring on its side adjacent said abutment wall and the surface of said abutment wall being such that said support ring makes contact with said abutment wall only in a narrow annular region thereof in its relaxed condition intermediate said radially inner and radially outer circumferential walls and the O-ring contacting the support ring in two regions which are radially inward and outward of said narrow annular region, whereby pressure applied to the side of said O-ring remote from said support ring causes said radially inner and outer circumferential walls to be bowed into contact, respectively, with said annular inner and outer walls so as to prevent extrusion of said O-ring past said support ring.

7. A seal assembly as claimed in claim 6 in which the support ring is permanently secured to the O-ring.

* * * * *